(12) United States Patent
McConnell (10) Patent No.: US 9,434,868 B2
(45) Date of Patent: Sep. 6, 2016

(54) DE-ICER AND/OR ANTI-ICER COMPOSITIONS AND METHODS

(71) Applicant: ESSECO UK LIMITED, Wakefield (GB)

(72) Inventor: Alistair McConnell, Wakefield (GB)

(73) Assignee: ESSECO UK LIMITED, Wakefield (GB)

( * ) Notice: Subject to any disclaimer, the term of this patent is extended or adjusted under 35 U.S.C. 154(b) by 0 days.

(21) Appl. No.: 14/409,608

(22) PCT Filed: Jun. 24, 2013

(86) PCT No.: PCT/GB2013/051647
§ 371 (c)(1),
(2) Date: Dec. 19, 2014

(87) PCT Pub. No.: WO2013/190332
PCT Pub. Date: Dec. 27, 2013

(65) Prior Publication Data
US 2015/0252239 A1    Sep. 10, 2015

(30) Foreign Application Priority Data

Jun. 22, 2012 (GB) .................................. 1211060.7
Jul. 5, 2012 (GB) .................................. 1211995.4

(51) Int. Cl.
*C09K 3/18* (2006.01)

(52) U.S. Cl.
CPC *C09K 3/185* (2013.01); *C09K 3/18* (2013.01)

(58) Field of Classification Search
CPC ................................. C09K 3/18; C09K 3/185
USPC ............................................. 106/13; 252/70
See application file for complete search history.

(56) References Cited

U.S. PATENT DOCUMENTS

| 4,728,393 A | 3/1988 | Peel |
| 4,746,449 A | 5/1988 | Peel |
| 2008/0099716 A1 | 5/2008 | Koefod |
| 2013/0068993 A1* | 3/2013 | Pylkkanen ............ C09K 3/185 252/70 |

FOREIGN PATENT DOCUMENTS

| CA | 1260696 A1 | 9/1989 |
| CN | 101671539 A | 3/2010 |
| CN | 102002341 A | 4/2011 |
| KR | 20010045160 A | 6/2001 |
| KR | 120008311 A | 1/2012 |
| WO | 2009146562 A1 | 12/2009 |

OTHER PUBLICATIONS

International Search Report in related Great Britain Application No. GB1211995.4, mailed Nov. 6, 2012.
International Search and Written Opinion from related PCT Application No. PCT/GB2013/051647 mailed Sep. 11, 2013.
International Preliminary Report on Patentability issued on Dec. 23, 2014 in related International Patent Application No. PCT/GB2013/051647.

* cited by examiner

*Primary Examiner* — Anthony J Green
(74) *Attorney, Agent, or Firm* — Troutman Sanders LLP; Ryan A. Schneider; Alexis N. Simpson (57) ABSTRACT

The invention relates to a de-icer or anti-icer composition for a travelled surface comprising: at least about 25% w/w of at least one acetate salt; and from about 14% to about 50% w/w of at least one non-acetate salt wherein the total concentration of said at least one acetate salt and said at least one non-acetate salt in the de-icer or anti-icer composition is at least about 57% w/w. The acetate salt can be selected from the group comprising potassium, sodium, lithium, magnesium, calcium, ammonium acetate or mixtures thereof. The non-acetate salt can selected from the group comprising one or more cations selected from the group consisting of potassium, sodium, lithium, magnesium, calcium, ammonium or mixtures thereof and one or more anions selected from the group consisting of formate, propionate, butyrate, isobutyrate, oxalate, malonate, succinate, glutarate, adipate, citrate, gluconate, benzoate, carbonate, bicarbonate, fluoride, chloride, bromide or mixtures thereof. The balance can be solvent and optionally not more than about 5% w/w in total of one or more auxiliary or incidental additives.

27 Claims, 4 Drawing Sheets

*Urea values are plotted against 0.5 X molal concentration, to allow them to be plotted against the same set of $\delta T = K_F \cdot b \cdot i$ values as the other freeze point depressants shown. This is because the value of i is1 for urea and 2 for all of the other freeze point depressant systems shown.

DE-ICER AND/OR ANTI-ICER COMPOSITIONS AND METHODS

CROSS-REFERENCE TO RELATED APPLICATIONS

This application is a US National Stage of International Application No. PCT/GB2013/051647, filed 24 Jun. 2013, which claims the benefit of GB Application No. 1211060.7, filed 22 Jun. 2012, and GB Application No. 1211995.4, filed 5 Jul. 2012, each herein fully incorporated by reference.

BACKGROUND

1. Technical Field

Embodiments of the present disclosure relate to improved compositions for de-icing surfaces and to anti-icing compositions intended to prevent icing of surfaces in freezing conditions. In some embodiments, the compositions of the present disclosure are further suitable for preventing the build-up of snow or other frozen or freezing precipitation on surfaces. In some embodiments the compositions of the present disclosure can provide enhanced de-icing and anti-icing performance and enhanced environmental benefits in comparison to conventional products. In some embodiments the compositions of the present disclosure can usefully be applied to surfaces traversed by vehicles and by pedestrians, for example. In some embodiments of the present disclosure the compositions of the invention can usefully be applied to ground surfaces traversed by aircraft.

2. Background of Related Art

Chemical de-icing and anti-icing treatments are routinely used in freezing weather conditions, notably in the winter and in cold climates, to prevent the formation or build up of snow and/or ice on surfaces traversed by pedestrians or vehicles, such as on paths, pavements (sidewalks), stairways, roads, airport taxiways, aprons and runways and such like. Such compositions act by melting existing snow and ice, or by preventing the formation of ice, on the surface to which the treatment is applied.

The use of de/anti-icer compositions at airports imposes particular constraints on the nature of the compositions in terms of their effectiveness, their compatibility with aircraft (for example the compositions must not cause corrosion or other damage to any part of the aircraft which might have a detrimental effect on the airworthiness of the aircraft) and, more recently, in terms of the environmental effects of the compositions.

Many prior art de/anti-icer compositions for use on travelled surfaces have contained ethylene glycol. Although ethylene glycol-containing compositions demonstrate high performance with regard to de-icing and anti-icing ability, they also suffer from several significant disadvantages. Any de/anti-icer composition applied to a travelled surface is likely to be washed off the surface by water from melting snow and ice and/or by rainwater. The de/anti-icer composition is thus brought into contact with the wider environment. Ethylene glycol is toxic to humans with numerous cases of poisoning reported in the UK and worldwide. Furthermore, ethylene glycol-based de/anti-icers have a high Chemical Oxygen Demand (COD) and thus exhibit deleterious effects when exposed to the wider environment following their application. As a result, the use of ethylene glycol has been prohibited in aircraft de-icing fluids in Europe and at some airports in North America.

Alternative de-icer compositions include those with urea as the active ingredient. However, urea-based de-icer compositions have a highly adverse environmental impact due to their very high COD and by acting as a rich source of nitrogen. Urea-based de-icer compositions are therefore highly damaging to any watercourses which receive run-off from the surface to which the de-icer is applied. In addition, the suitability of urea-based compositions as effective de-icers is further compromised by a comparatively high minimum effective temperature of $-12°$ C. ($10°$ F.) which is insufficiently low in colder climates where lower ground temperatures are often encountered.

In an effort to overcome the disadvantages of ethylene glycol-containing and urea-containing products, de/anti-icing compositions based on 50% w/w aqueous solution of potassium acetate are now used at airports in cold winter climates around the world. Potassium acetate solution can be combined with suitable corrosion inhibitors and meets the high standards of non-corrosiveness to aircraft materials required for airside use, and the COD and Biological Oxygen Demand (BOD) load in water run-off generated by potassium acetate based products is much lower than ethylene glycol or urea-based compositions.

Airside de/anti-icing compositions based on 50% w/w aqueous solution of potassium formate are also used and function in the same way as 50% w/w potassium acetate based fluids but have even lower COD and BOD values.

It is generally considered advantageous in formulating liquid de/anti-icer compositions to seek a composition having the lowest possible freezing point to maximise the de/anti-icing performance of the composition. Chemical de/anti-icer compositions act as freezing point depressants and function by introducing the freezing point depressant into contact with the body of frozen or liquid water to which the de/anti-icer composition is applied. The freezing point depressant lowers the freezing point of the body of water. When the freezing point in a water-based system is below the ambient environmental temperature, frozen water is melted (resulting in a liquid solution of the freezing point depressant in water) and initially liquid water forms a solution of the freezing point depressant and is prevented from freezing.

The freezing point of a de/anti-icer composition based on water and a freezing point depressant is related to the concentration of the freezing point depressant. In most cases, as the concentration of the freezing point depressant is reduced by the introduction of more water, for example, by falling precipitation and/or by melting of ice or snow, the freezing point of the water-de/anti-icer composition mixture rises. That is, the resultant mixture of water and de/anti-icer composition freezes at a higher temperature than a corresponding mixture where the de/anti icer composition concentration is higher. If by the introduction of more water the freezing point of the mixture of de/anti-icer composition and water becomes equal to or greater than the ambient environmental temperature, the de/anti-icing composition ceases to be effective: the mixture will freeze. Consequently, with a mixture in this state, treated surfaces will freeze over or no further effective clearing of frozen water will occur unless further de/anti-icing composition is applied.

In view of the above considerations, potassium acetate or potassium formate based de-icers, are formulated at a concentration of approximately 50% w/w aqueous solution as this is approximately the eutectic point for such a composition. The freezing point of 50% w/w aqueous potassium formate or acetate is $-60°$ C. ($-76°$ F.). However, when the concentration of potassium formate or potassium acetate is increased to above this level, the freezing point becomes significantly higher. For example, a 65% w/w solution of potassium formate or potassium acetate has a freezing point of approximately −22° C. (−8° F.) and a 70% w/w solution has a freezing point of approximately −10° C. (14° F.). Therefore potassium acetate or potassium formate solutions of such high freezing points exhibit poor performance as de/anti-icer compositions and their practical use is limited. With such high freezing points there is a serious risk of the potassium acetate or potassium formate solution freezing in storage tanks, in the associated de-icing equipment or freezing on the ground during cold weather.

Unfortunately, limiting the de/anti-icer compositions to a maximum 50% w/w potassium formate or potassium acetate also limits the effectiveness of the compositions. Such compositions must necessarily comprise at least 50% w/w water. Because melting of ice and/or snow inherently causes further dilution, this inherent quantity of water limits the amount of further water/ice melt such compositions can accommodate before the freezing point of the resulting mixture rises above ambient temperature, that is, before the resulting mixture itself freezes. Consequently, both the "hold-over" time (i.e. the time during which the composition continues to have an anti-icing effect) of products based on 50% w/w acetate or formate compositions when applied as anti-icers, and the amount of frozen material that can be cleared per application as a de-icer, is limited. Furthermore, the presence of 50% w/w water means that the potassium acetate or potassium formate concentration gradient at the de-icer/ice boundary is relatively limited, which restricts the rate at which acetate or formate ions migrate down the concentration gradient into the crystal structure of the ice to cause it to melt.

The inventor has appreciated that potassium formate or potassium acetate ions present in standard 50% w/w aqueous de-icer compositions are also completely hydrated, negating any advantageous thermodynamic effects which could otherwise occur arising from interactions between incompletely hydrated species and water.

U.S. Pat. No. 5,064,551 describes de-icing compositions comprising potassium acetate or potassium formate, in conjunction with small amounts of phosphate and nitrite salts. The content of potassium acetate/formate can be as much as 60% w/w and compositions of 50% to 53% w/w potassium acetate/formate are stated to be preferred. Only compositions containing 50% potassium acetate are exemplified.

Embodiments of the present invention seek to provide de/anti icer compositions which can ameliorate or overcome some or all of the above problems. In particular, embodiments of the present invention seek to provide de/anti-icer compositions which can have at least one or more of the following advantages. That is, embodiments of the invention seek to provide de/anti-icer compositions which: (i) can be effective at lower temperatures, (ii) can be applied at lower application rates, (iii) can be relatively inexpensive, (iv) can have reduced environmental impact and/or (v) can be safe for applications where the compositions may come into contact with aircraft.

BRIEF SUMMARY

Embodiments of the present invention relate to improved compositions for de-icing surfaces and to anti-icing compositions intended to prevent icing of various surfaces in freezing conditions. In some embodiments, the compositions disclosed herein can be used for preventing the build-up of snow or other frozen or freezing precipitation on surfaces. In some embodiments, the compositions disclosed herein can provide enhanced de-icing and anti-icing performance and reduced environmental impact in comparison to conventional products. Embodiments of the present invention can be applied to surfaces traversed by vehicles and pedestrians, for example, and to ground surfaces traversed by aircraft and other vehicles.

In some embodiments, the de-icer or anti-icer composition for a travelled surface can comprise approximately 25% w/w or more of one or more acetate salts and from approximately 14% to approximately 50% w/w of one or more non-acetate salts; wherein the total concentration of the one or more acetate salts and the one or more non-acetate salts is approximately 57% w/w or more.

In some embodiments, the one or more acetate salts can be selected from the group consisting of potassium, sodium, lithium, magnesium, calcium, ammonium acetate, and mixtures thereof. In some embodiments, the one or more non-acetate salts can be selected from the group consisting of one or more cations selected from the group consisting of potassium, sodium, lithium, magnesium, calcium, ammonium and mixtures thereof. In some embodiments, the one or more non-acetate salts can be selected from the group consisting of one or more anions selected from the group consisting of formate, propionate, butyrate, isobutyrate, oxalate, malonate, succinate, glutarate, adipate, citrate, gluconate, benzoate, carbonate, bicarbonate, fluoride, chloride, bromide, and mixtures thereof.

In some embodiments, the composition can be a liquid.

Particular embodiments of the present invention provide a de-icer or anti-icer composition for a travelled surface comprising:

at least about 25% w/w of at least one acetate salt selected from the group consisting of potassium, sodium, lithium, magnesium, calcium, ammonium acetate or mixtures thereof; and from about 14% to about 50% w/w of at least one non-acetate salt consisting of one or more cations selected from the group consisting of potassium, sodium, lithium, magnesium, calcium, ammonium or mixtures thereof and one or more anions selected from the group consisting of formate, propionate, butyrate, isobutyrate, oxalate, malonate, succinate, glutarate, adipate, citrate, gluconate, benzoate, carbonate, bicarbonate, fluoride, chloride, bromide or mixtures thereof;

the balance being solvent and optionally not more than about 5% w/w in total of one or more auxiliary or incidental additives, wherein the total concentration of said at least one acetate salt and said at least one non-acetate salt in the de-icer or anti-icer composition is at least about 57% w/w.

In some embodiments the ratio of acetate salt:non-acetate salt can be from about 3:1 to about 1:3.

In some embodiments the composition can comprise from about 25% to about 57% w/w of said at least one acetate salt.

In some embodiments the total concentration of said at least one acetate salt and said at least one non-acetate salt can be from about 57% to about 76% w/w.

In some embodiments the composition can comprise from about 25% to about 45% w/w of said at least one acetate salt. In further embodiments the composition can comprise from about 25% to about 40% w/w of said at least one acetate salt and in still further embodiments the composition can comprise from about 25% to about 35% w/w of said at least one acetate salt.

In further embodiments the composition can comprise between 30% and 35% w/w of said at least one acetate salt.

In still further embodiments the composition can comprise from about 14% to about 45% w/w of said at least one non-acetate salt. In further embodiments the composition can comprise from about 14% to about 40% w/w of said at least one non-acetate salt. In still further embodiments the composition can comprise from about 14% to about 35% w/w of said at least one non-acetate salt.

In certain embodiments the composition can comprise between 25% and 35% w/w of said at least one non-acetate salt.

In further embodiments the total concentration of said at least one acetate salt and said at least one non-acetate salt in the de-icer or anti-icer composition can be from more than 60% to about 76% w/w. In other embodiments the total concentration of said at least one acetate salt and said at least one non-acetate salt in the de-icer or anti-icer composition can be from more than 60% to about 65% w/w. In still other embodiments the total concentration of said at least one acetate salt and said at least one non-acetate salt in the de-icer or anti-icer composition can be from about 61% to about 76% w/w.

In further embodiments the total concentration of said at least one acetate salt and said at least one non-acetate salt in the de-icer or anti-icer composition can be from about 61% to about 65% w/w. In other embodiments the total concentration of said at least one acetate salt and said at least one non-acetate salt in the de-icer or anti-icer composition can be from about 62% to about 64% w/w. In still other embodiments the total concentration of said at least one acetate salt and said at least one non-acetate salt in the de-icer or anti-icer composition can be about 62.25% to about 62.75%.

In some embodiments a cation of the at least one acetate salt can be selected from the group consisting of potassium, sodium or lithium or mixtures thereof and more especially said cation is potassium.

In preferred embodiments the at least one non-acetate salt consists of one or more cations selected from the group consisting of potassium, sodium, lithium or mixtures thereof. In other embodiments the cation can be potassium.

In some embodiments the at least one non-acetate salt can comprise one or more anions selected from the group consisting of formate, propionate, succinate or mixtures thereof. In further embodiments said anion can be formate.

In some embodiments said acetate salt can be potassium acetate and said non-acetate salt can be potassium formate.

In some embodiments said one or more auxiliary or incidental additives can be selected from one or more of corrosion inhibitors, stabilisers, viscosity modifiers, surfactants, pH buffers and anti-foaming agents. In some embodiments an auxiliary or incidental additive can be a dye. In certain embodiments, the dye can be a blue dye.

In the present invention, an "auxiliary or incidental additive" is a component of the composition, present in a relatively small amount (relative to the acetate and non-acetate salts), the primary intended purpose (as recognized by a person skilled in the art) of which is other than the depression of freezing point. Thus an auxiliary or incidental additive can be included to modify properties (which may be initial properties or post-application properties) of the composition of the invention other than those connected directly with de-icing or anti-icing. Given the wide range of possible auxiliary or incidental additives, it is possible that a given auxiliary or incidental additive can have some freezing point depressing effect However such effect is de minimis compared with that of the acetate and non-acetate salt combination, notably in view of the small amount of such additive which is present in the composition. Notable auxiliary or incidental additives include corrosion inhibitors.

In embodiments said one or more incidental or auxiliary additives can be a corrosion inhibitor or a combination of corrosion inhibitors.

In some embodiments said corrosion inhibitors or combination of corrosion inhibitors can be at least one member selected from the group comprising: carboxylic acids of carbon number C3 or greater or the sodium, potassium, lithium, calcium, magnesium or ammonium salts thereof, amines, amides, azoles or imides or the carboxylate, phosphate, phosphonate, or borate salts thereof, phosphonates or the sodium, potassium, lithium, calcium, magnesium or ammonium salts thereof, inorganic salts of carbonic acid, sodium or potassium silicates, inorganic salts of nitrous acid and/or inorganic salts of boric acid.

In some embodiments said corrosion inhibitor or combination of corrosion inhibitors can be selected from the group comprising potassium or sodium salts of one or more saturated or unsaturated C6 carboxylic acids, potassium or sodium salts of one or more saturated C9 carboxylic acids, one or more potassium or sodium salts of carbonic acid and potassium or sodium silicate.

In certain embodiments, a combination of corrosion inhibitors can comprise (or can consist of) potassium or sodium salts of one or more saturated or unsaturated C6 carboxylic acids, potassium or sodium salts of one or more saturated C9 carboxylic acids, one or more potassium or sodium salts of carbonic acid and potassium or sodium silicate.

In some embodiments the total concentration of said corrosion inhibitor or combination of corrosion inhibitors can be not more than about 1% by weight of the composition.

In some embodiments, the pH of the composition can be from pH 7 to pH 11.5. In further embodiments the pH of the composition can be about pH 11.

In some embodiments the composition can exhibit a net system temperature increase of at least 1.0° C. (2° F.) when mixed on an equal weight basis with water when following the heat of hydration test procedure as specified herein.

In further embodiments said composition can exhibit a net system temperature increase of at least 4.0° C. (7° F.) when mixed on an equal weight basis with water when following the heat of hydration test procedure as specified herein.

In further embodiments a unit of the composition, such as a given mass of said composition (i.e. a composition as above defined), when applied to the surface of a body of ice of known mass and surface area at −2° C. (28° F.) or −10° C. (14° F.), over a period of 5, 10 or 30 minutes can melt a mass of ice at least 25% greater than the equivalent unit (such as the same mass) of a 50% w/w aqueous solution of potassium acetate applied to a body of ice with the same mass and surface area (as the body of ice to which the composition of the invention is applied) for the same time at the same temperature.

In certain embodiments, a unit of said composition, such as a given mass of said composition (i.e. a composition as above defined), when applied to the surface of a body of ice of known mass and surface area at −2° C. (28° F.) or −10° C. (14° F.), over a period of 5, 10 or 30 minutes, can melt a mass of more than 40% greater than an equivalent unit (such as the same mass) of a 50% w/w aqueous solution of potassium acetate applied to a body of ice with the same mass and surface area (as the body of ice to which the composition of the invention is applied) for the same time at the same temperature.

In embodiments the percentage mass of ice melted is determined according to the ice melting performance test procedure as specified herein.

In some embodiments said solvent is an aqueous solvent and more especially said solvent is water.

According to further embodiments of the present invention there is provided a method of treating a travelled surface comprising applying to the surface a de-icing or anti-icing composition as defined herein.

According to further embodiments of the invention there is provided a method of de-icing a travelled surface comprising applying to the surface a de-icing or anti-icing composition as defined herein.

According to further embodiments of the invention there is provided a method of preventing or deterring ice formation and/or snow build up on a travelled surface comprising applying to said surface an anti-icing composition as herein.

BRIEF DESCRIPTION OF THE DRAWINGS

Embodiments of the invention are further described hereinafter with reference to the accompanying drawings, in which.

DETAILED DESCRIPTION

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. For example, while the compositions disclosed herein are described for use with aircraft and related surfaces, they can be equally applicable to automotive and domestic uses.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "including" is meant that at least the named compound, element, particle, or method step is present in the composition or article or method, but does not exclude the presence of other compounds, materials, particles, method steps, even if the other such compounds, material, particles, method steps have the same function as what is named. It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, the terms "de/anti-icer", "de/anti-icer compositions" and "de/anti icing compositions" and linguistic or grammatical variants thereof refer to chemical compositions suitable for application to a surface to melt existing water in frozen form (i.e. ice or snow), or to prevent the formation of ice or settling or accumulation of snow or other frozen or freezing precipitation on the surface in freezing conditions. Any given composition can be suitable for use only as a de-icer, only as an anti-icer or as both a de-icer and an anti-icer depending, for example, on the nature of the surface to which the de/anti-icer composition is applied and the presence or absence of other formulation agents (such as corrosion inhibitors or viscosity modifiers, for example) which can render the composition suitable, or unsuitable, for application to a given surface.

Generally, the terms "de-icer" "de-icer composition" and "de icing composition" and linguistic or grammatical variants thereof are used to refer to a chemical composition suitable for application to a surface to remove existing ice or snow or other frozen or freezing precipitation.

Generally the terms "anti-icer", "anti-icer compositions" and "anti-icing compositions" and linguistic or grammatical variants thereof are used to refer to a chemical composition suitable for application to a surface to prevent the formation of ice or settling of snow or other frozen or freezing precipitation.

It is noted, however, that a de-icer composition when applied to a surface can have an on-going effect after initial ice and snow has been removed, preventing the formation of further ice and snow or other frozen or freezing precipitation (i.e. an anti-icing effect).

As used herein, the term "travelled surface" and linguistic or grammatical variants thereof refers to a ground surface traversed by a pedestrian or by any type of land vehicle or by an aircraft when on the ground, and in particular to such surfaces where the presence or formation of frozen water such as ice or snow would limit, restrict, prevent, make hazardous or otherwise represent an increased danger to, the safe traversal of the surface by a pedestrian, land vehicle or aircraft.

The term "travelled surface" can also apply to any surface where, in freezing conditions (or in anticipation of freezing conditions), de-icer and/or anti-icer compositions are conventionally applied and more especially to such surfaces which are constructed for the specific purpose of traversal by pedestrians, land vehicles or aircraft when on the ground.

Examples of travelled surfaces include, without limitation, footpaths, footways and tracks, pavements (sidewalks), walkways, boardwalks, stairways, roads and highways, bridges, footbridges, car parks (parking lots), railways (railroads), railway stations (train stations) and platforms, tramways and tram stops, bus stops, airport taxiways, airport aprons and airport runways.

In some embodiments of the present invention, the term "travelled surface" refers in particular to any ground surface traversed by a vehicle at the "airside" part of an airport, including one or more of ground surfaces traversed by aircraft during take-off, landing and/or taxiing operations. "Travelled surface" refers especially to such surfaces at commercial airports. Thus "travelled surface" refers in aspects and embodiments of the invention to any ground surface traversed by passenger- and/or freight-carrying commercial aircraft and notably to any such ground surface traversed by passenger- and/or freight-carrying commercial aircraft operating scheduled or charter services.

Other travelled surfaces traversed by aircraft within the ambit of the present invention can include runways and taxing surfaces and apron areas at military airbases and at private airfields, aerodromes and flying clubs.

Herein aircraft may refer to either or both of fixed wing aircraft and rotary wing aircraft.

The de/anti-icer compositions of the present invention seek to mitigate or overcome the problems associated with prior art compositions by providing an aqueous de/anti-icing composition comprising at least one acetate salt and at least one non-acetate salt. In embodiments, the de/anti-icer composition is a liquid composition.

One benefit of using a liquid de/anti-icer is that these compositions demonstrate improved performance and have reduced environmental impact compared to known solid compositions. The improved performance can be derived from the concentration of salts used in the compositions that can ultimately arise in a synergistic effect that can lead to a decrease in the freezing point of the mixed salt de/anti-icer solution.

In embodiments enhanced de/anti icing performance can be obtained when the total salt concentration, being the sum of the concentration of the at least one acetate salt and the concentration of the at least one non-acetate salt, is at least about 57% w/w. In some embodiments said total salt concentration is greater than 57% w/w, and in sill further embodiments is greater than 60% w/w, such as 61% w/w or more, or about 62.5% w/w.

The sum of the concentration of said at least one acetate salt and the concentration of said at least one non-acetate salt is referred to herein as the "total salt concentration" of the composition.

More particularly, in preferred compositions the total salt concentration is from 57 to about 76% w/w of the de/anti-icer composition. Optimally, the total salt concentration is about 61 to 65% w/w of the de/anti-icer composition such as about 62 to 64% w/w of the de/anti-icer composition and notably about 62.25 to about 62.75% w/w of the de/anti-icer composition.

Certain mixtures of acetate and non-acetate salts can exhibit a beneficial synergistic effect on freezing point depression, such that a solution of an acetate and non-acetate salt mixture, as herein described, can exhibit a lower freezing point than a solution of the same total salt concentration of either of the individual salts alone.

Figure 1:
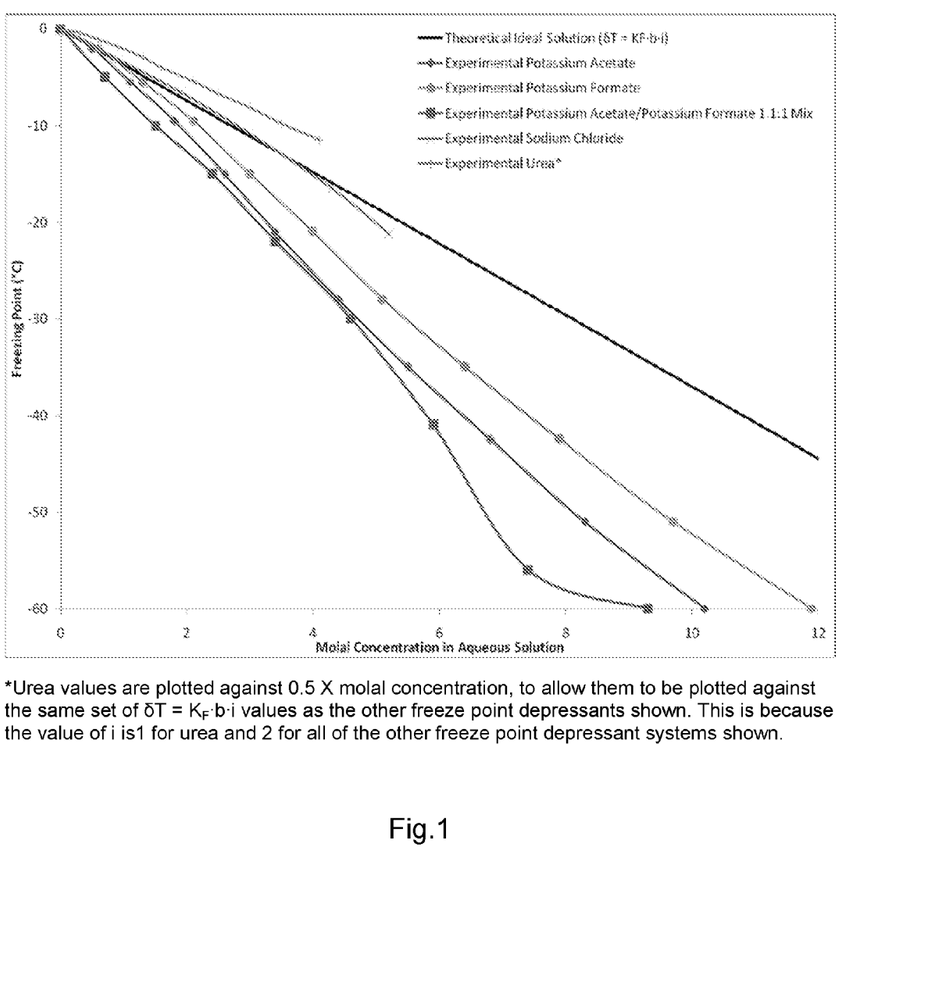
FIG. 1 is a graph showing the freezing point of aqueous solutions of potassium acetate, potassium formate and potassium acetate/potassium formate mixture of ratio 1.1:1, sodium chloride, urea and a theoretical ideal solution plotted against total molal concentration.

The impact of solute/solvent interactions on the freezing point depression of a system is shown by FIG. 1. Aqueous potassium acetate and potassium formate solutions above approximately 1 molal concentration of salt exhibit real (i.e. experimentally measured) freezing points significantly lower than the theoretical values derived from the freezing point depression equation:

$$\delta T = K_F \cdot b \cdot i \quad (1)$$

where $\delta T$ represents the change in freezing point compared to pure solvent, $K_F$ represents the cryoscopic constant of the solvent, b represents the molality of the solute and i represents the van 't Hoff factor of the solute.

Freezing point equation (1) assumes an ideal solution in which no solvent/solute interactions occur and freezing point depression is purely determined by colligative effects. The lower real freezing point of potassium acetate and potassium formate solutions compared to the theoretical value derived from equation (1) is due to advantageous non-ideal solute/solvent interactions.

The presence in the compositions disclosed herein of both the acetate salt and the non-acetate salt (especially a formate salt) is believed to synergistically enhance this system of advantageous non-ideal solute/solvent interactions by:

(a) allowing a greater range of complex multi-anion solute/solvent interactions to occur, and (b) increasing the activity co-efficient of acetate and non-acetate ions with respect to solute/solvent interactions by reducing the anion:water ratio for each given anion at any given total salt concentration.

This is believed to have the effect of driving the equilibrium non-water-interacting anion $\rightleftharpoons$ water-interacting anion to the right for both acetate and non-acetate anions. This effect is believed to be particularly important at high total salt concentrations where the activity co-efficient of anions with respect to solvent/solute interactions is likely to be limited in single salt systems by the position of this equilibrium.

As shown in FIG. 1, experimentally measured freezing point values for a realisation of the composition consisting of a mixture of potassium acetate and potassium formate in a ratio of 1.1:1 (corresponding to the ratio as used in a typical composition for the invention) exhibit a deviation of greater (and thus advantageous) magnitude from the theoretical value derived from $\delta T = K_F \cdot b \cdot i$ than either a solution of potassium acetate alone or of potassium formate alone at all concentrations up to and including those with an experimentally measured freezing point of −60° C. (−76° F.). This increased advantageous effect of the composition according to the invention compared to the individual solutions of its constituent salts is particularly great above approximately 5 molal concentration (i.e. equating to approximately 32% w/w total salt concentration). As such, the freezing point of the mixed acetate formate salt solution as specified in the present invention is significantly lower than the freezing point of a pure potassium acetate or potassium formate solution of equivalent w/w salt concentration.

In addition, the combination of the acetate salt and the non-acetate salt (in particular the formate salt), at the specified total salt concentration, can prevent the solution from undergoing true crystalline freezing and instead forces the solution to undergo a glass transition. This is believed to be due to a much higher degree of disorder in the mixed salt system compared to a single salt system of equivalent total salt concentration. At the specified salt concentration, the overall degree of disorder of the mixed salt/water system of the invention is sufficient to prevent ordered (crystalline) solidification at the eutectic total salt concentration and at higher total concentrations. At greater-than-eutectic total salt concentrations within the specified salt concentration range (i.e. typically up to about 76% total salt concentration), the solidification temperature of the mixed salt solution of the invention is observed to be the same as the eutectic temperature, that is, approximately −60° C. (−76° F.). This feature of the mixture enables very high total salt concentrations to be practically employed in the formulation of de/anti-icing products, in contrast to solutions respectively of potassium acetate alone or of potassium formate alone for which the freezing point of the solution rises rapidly with increasing salt concentration above the eutectic concentration (50% w/w). As mentioned above, this rapid rise in freezing point effectively precludes the use of significantly higher-than-eutectic potassium acetate or potassium formate single salt solutions in such liquid formulations for reasons of cold weather efficacy and storage stability. As noted, such a rise in freezing point means that the single salt compositions can freeze in storage rendering them unusable.

To maximise the beneficial effects of the synergistic interactions between the salts in the compositions of the invention, the relative amount of the at least one acetate salt with respect to the at least one non-acetate salt can be (at least approximately) within a defined range. In some embodiments, the composition of the invention can consist of from about 25% to 57% w/w of at least one acetate salt and from about 14% to about 50% w/w of at least one non-acetate salt.

Advantageously, in some embodiments, the ratio of acetate to non-acetate salt can be from 3:1 to 1:3. In some embodiments, the ratio can be from about 2:1 to about 1:2. In other embodiments, the ratio can be from about 1.5:1 to about 1:1.5. In still other embodiments, the ratio of acetate to non-acetate salt can be about 1.1:1.

The advantageous synergistic effects resulting from the provision in solution of both the acetate and non-acetate salts present in the composition of the invention tends to decrease for mixtures formulated outside of the ranges specified herein. Thus, for example, mixtures formulated to comprise 5% of at least one non-acetate salt and 50% acetate salt experience negligible benefit from the synergistic effects associated with the salts resulting in a sharp rise in the freezing point of the composition when further diluted by additional water.

The specified total salt content of the compositions according to the invention is believed to ensure that some or all of the acetate ions remain incompletely hydrated. This incomplete hydration represents an important advantage of the compositions of the invention. Specifically, when the de-icer composition according to the invention is mixed with water a net temperature increase is observed due partly or wholly to heat of completion of the hydration of the-acetate ions. Ultimately this can enable faster ice melting due to the exothermic effect arising from the heat of hydration. In order to benefit from the heat of hydration effect, in embodiments acetate salts can comprise at least 25% w/w of the composition of the invention. The effective maximum acetate concentration is governed by the highest concentration at which the acetate salt will dissolve, which is typically around approximately 76% w/w.

Acetate salts which are useful in the de/anti-icer compositions according to the invention include those having a cation selected from the group comprising potassium, sodium, lithium, magnesium, calcium, ammonium or mixtures thereof.

Useful non-acetate salts to be included with the-acetate salt(s) in the de-icer compositions of the invention include those having cations selected from the group comprising potassium, sodium, lithium, magnesium, calcium, ammonium or mixtures thereof.

Useful non-acetate salts to be included with the acetate salt(s) in the de-icer compositions of the invention include those having anions from the group selected from the group comprising formate, propionate, butyrate, isobutyrate, oxalate, malonate, succinate, glutarate, adipate, citrate, gluconate, benzoate, carbonate, bicarbonate, fluoride, chloride, bromide or mixtures thereof. Succinate can have the property of making the de/anti-icer composition somewhat slippery and therefore such composition can be unsuitable for use on travelled surfaces. Accordingly, in certain embodiments, useful non-acetate salts to be included with the acetate salt(s) in the de-icer compositions of the invention include those having anions from the group selected from the group comprising formate, propionate, butyrate, isobutyrate, oxalate, malonate, glutarate, adipate, citrate, gluconate, benzoate, carbonate, bicarbonate, fluoride, chloride, bromide or mixtures thereof. In some situations compositions including chloride may not meet non-corrsoion requirements, such as in relation to aircraft when the de/anti-icer compositions according to embodiments of the invention are used at airside locations. Accordingly, in some embodiments of the invention the anion of the non acetate salt is other than chloride.

Conveniently, potassium can be used in the compositions of the invention as the counter ion of the acetate salt or of the non-acetate salt, or of both the acetate and non-acetate salts. Inclusion of potassium salts can encourage faster ice melting due to the high water affinity and mobility of potassium ions, which can enable a high rate of diffusion of freezing point depressant into the ice crystal structure. This effect can occur via a mechanism involving a rapidly moving diffusion front of potassium ions, with the corresponding acetate and/or non-acetate anions rapidly following the diffusion front by moving down a local electrochemical gradient generated by the movement of potassium ions. The comparatively higher total salt concentration of the compositions disclosed herein can lead to the creation of a greater concentration gradient at the de-icer/ice boundary which can further significantly enhance the faster penetration effect of the freezing point depressant into the ice crystal structure compared to a conventional 50% w/w potassium acetate or 50% potassium formate solution.

As noted above, the de-icer composition may optionally include a corrosion inhibitor or a combination of corrosion inhibitors, such as for use in locations where aircraft can be present. Suitable corrosion inhibitors can comprise C3 or greater carboxylic acids (such as, for example, propanoic acid, butanoic acid, pentanoic acid and so on) or the potassium, sodium, lithium, magnesium, calcium and/or ammonium salts of such carboxylic acids. Other suitable corrosion inhibitors can comprise C3 or greater alcohols (e.g. propargyl alcohol), ketones (e.g. acetophenone) or aldehydes (e.g. cinnamaldehyde). Further suitable corrosion inhibitors can comprise amines (e.g hexylamine), amides (e.g. ethoxylated fatty amines), imides (e.g. ethoxylated cocoimidazolines), azoles (e.g. benzotriazole) and/or the carboxylate (e.g. ethoxylated cocoimidazoline acetate), carbonate, bicarbonate (e.g. cyclohexylamine salts of carbonic acid), phosphate, phosphite, phosphonate (e.g. triethanolamine salts of orthophosphoric acid, polyphosphoric acid, phosphorous acid or phosphonic acid), sulphate, sulphite, sulphonate (e.g. diisobutylamine salts of sulphuric acid, sulphurous acid or sulphonic acid), nitrite (e.g. dicyclohexylamine nitrite) or borate (e.g. aminoethoxyethanol salts of boric acid) salts thereof. Phosphonates or the potassium, sodium, lithium, magnesium, calcium, aluminium and/or ammonium salts thereof may also be used. Further corrosion inhibitors can include sulphonates or the potassium, sodium, lithium, magnesium, calcium, and/or ammonium salts thereof. Inorganic salts can also form suitable corrosion inhibitors. Specifically, silicates or inorganic salts of carbonic acid, phosphoric acid, phosphorous acid, boric acid, sulphuric acid, sulphurous acid, nitric acid or nitrous acid are suitable. Furthermore, inorganic and organic salts of zinc can be suitable as corrosion inhibitors.

Some of the non-acetate salts suitable for inclusion in the de/anti-icer compositions of the invention can have the added benefit of acting also as corrosion inhibitors, one example being C3 or greater carboxylate salts such as potassium propionate. In this case, the amount and/or composition of the optional incidental or auxiliary additives acting as corrosion inhibitors can be adjusted accordingly. Thus, a lower amount of corrosion inhibitors can be included in the de/anti-icer composition and/or a different combination of corrosion inhibitors may be used, for example.

Given the wide range of possible auxiliary or incidental additives which may be included for various different purposes, it is possible that a given auxiliary or incidental additive may have some freezing point depressing effect. However such effect is de minimis compared with that of the acetate and non-acetate salt combination, notably in view of the small amount of such additive which is present in the composition. Accordingly, these auxiliary or incidental additives which may have a small or incidental freezing point depressing effect but which are included for a primary purpose, function or effect (as recognised by a person of ordinary skill in the art) other than freezing point depression (such as inhibition of corrosion) are, for the purposes of the present invention, not included in the calculation of the amount of non-acetate salt(s) in the de/anti-icer composition.

In embodiments wherein auxiliary or incidental additives are incorporated to function primarily as corrosion inhibitors, said auxiliary or incidental additives comprise less than 5% w/w in total of the total concentration of the de/anti-icer composition according to the invention. In some embodiments, the corrosion inhibitors, where included, can comprise not more than 1% w/w in total of the composition.

In some embodiments two or more corrosion inhibitors can be included in the de/anti-icer composition of the invention. In an embodiment, the corrosion inhibitors can be selected from a mixture of potassium or sodium salts of one or more saturated or unsaturated C6 carboxylic acids, potassium or sodium salts of one or more saturated C9 carboxylic acids, one or more potassium or sodium salts of carbonic acid and potassium or sodium silicate.

Corrosion inhibitor combinations suitable for use, in particular, at airside locations of airports are commercially available and can generally be incorporated into the compositions of the present invention, with the proviso that such commercial corrosion inhibitor combinations do not materially compromise the effectiveness of the de/anti icing properties of the compositions.

In some embodiments the pH of the de/anti-icer composition of the invention can be in the range of pH 7 to 11.5 to ensure conformance with international standard levels for commercial airfield de-icer products. In further embodiments, the pH of the de/anti-icer composition of the invention can be in the range of pH 10.5 to pH 11.5. In still further embodiments, the pH of the de/anti-icer composition can be about pH 11.

The properties and advantages of the de/anti-icer compositions of the present invention are further demonstrated by the following examples:

Typical compositions of the de/anti-icer disclosed herein are shown in Table 1.

TABLE 1

Typical Compositions of the de/anti-icer

| Composition | 1 | 2 | 3 | 4 | 5 | 6 |
|---|---|---|---|---|---|---|
| Potassium Acetate % w/w | 29 | 31 | 33 | 35 | 37 | 39 |
| Potassium Formate % w/w | 29 | 28 | 30 | 32 | 37 | 35 |
| Water % w/w | 41 | 40 | 36 | 32 | 25 | 25 |
| Corrosion Inhibitors % w/w | <1 | <1 | <1 | <1 | <1 | <1 |

The suggested application rates of de/anti-icer composition 3 according to Table 1, to maximise the de-icing and anti-icing effect, are shown in Table 2, by way of example. The skilled person will be able to adapt the application rates in accordance with particular weather conditions prevailing, or anticipated, locally and likewise for other formulations within the scope of the invention having different amounts of acetate and non-acetate salts.

TABLE 2

Suggested application rates

De-Icing

| | Ground temp. 0 to −5° C. | Ground temp. −5 to −10° C. | Groundtemp. below −10° C. |
|---|---|---|---|
| Frost/rime | 10 g/m² | 10 g/m² | 15 g/m² |
| Black ice | 20 g/m² | 25 g/m² | 30 g/m² |
| Packed snow/ice, depth <10 mm | 25 g/m² | 30 g/m² | 40 g/m² |
| Packed snow/ice, depth <10 mm | 40 g/m² | 50 g/m² | 60 g/m² |

Anti-Icing

| Wet surface, temp. expected to fail below 0° C. | 15 g/m² |
|---|---|
| Expected freezing rain | 25 g/m² |

Figure 2:
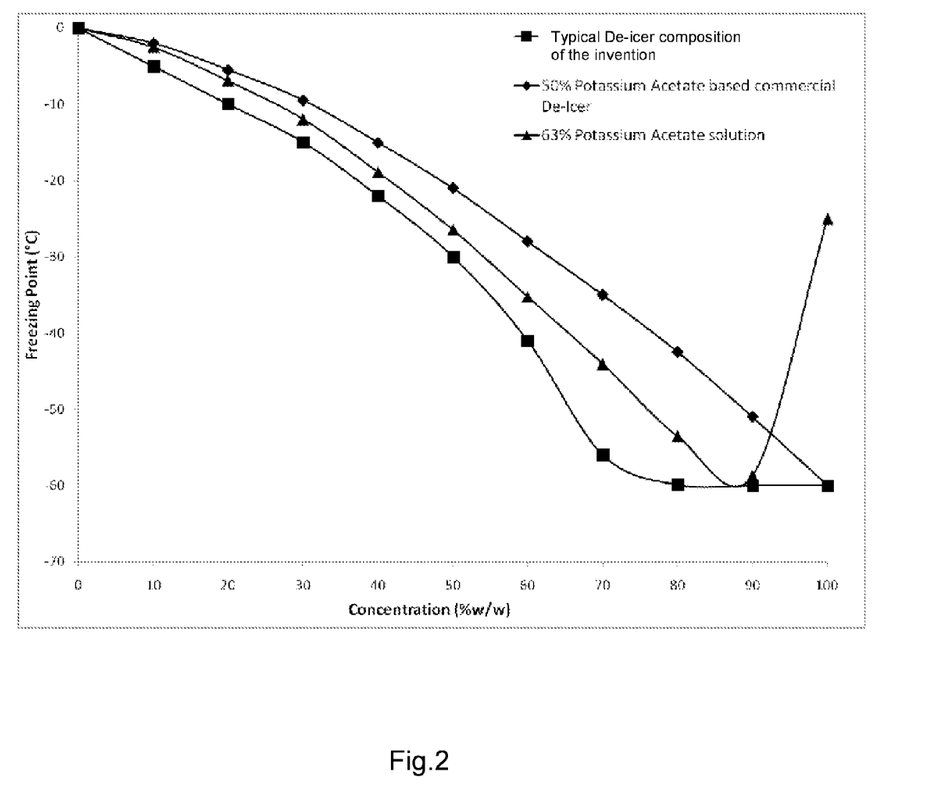
FIG. 2 is a graph showing the freezing point profile of a typical de/anti-icer composition of the invention compared to a 50% w/w potassium acetate based commercial de-icer solution and a 63% w/w potassium acetate based de-icer solution.

Properties of the de-icer or anti-icer composition 3 as described in Table 1 are shown in the freezing point profile graph in FIG. 2. From FIG. 2 it is apparent that as the respective solutions become diluted by additional liquid water from melting ice and snow, the freezing point of the composition according to the present disclosure can be, and can remain, significantly lower than that of a 50% w/w potassium acetate based commercial de-icer solution. For example, when the composition of the invention and the commercial de-icer are diluted to a concentration of 70% of their initial concentration by additional water, the freezing point of the commercial de-icer increases sharply to about −35° C. compared to about −56° C. for the composition according to the present disclosure. Furthermore, the de/anti-icer composition of the present disclosure can exhibit a consistently lower freezing point on dilution when compared to a solution comprising 63% potassium acetate only (i.e. a solution with equivalent total salt concentration to the composition 3 of Table 1). Thus when composition 3 of Table 1 and the 63% potassium acetate solution are diluted to a concentration of 70% by additional water, the freezing point of 63% potassium acetate only de-icer is about −45° C. compared to about −56° C. for the composition according to the present disclosure. This illustrates, the synergistic interaction of the different salts enables the composition of the present disclosure to achieve a lower freezing point than comparable acetate-only de-icer solutions of equivalent or similar total salt concentration.

The de/anti-icer composition 3 of Table 1 was independently and anonymously tested for ice melting performance by Anti-Icing Materials International Laboratory (AMIL), located at the University of Quebec at Chicoutimi, using test method AIR6170. For the AIR6170 method, at a given ambient temperature, 5 g of de-icer is poured onto a 60 g disc of ice in a Petri dish and the amount of ice melted is measured after 5 minutes, 10 minutes and 30 minutes. Simultaneous tests were conducted for 50% w/w potassium acetate solution, two anonymous commercial de-icer products both based on 50% w/w potassium acetate and one anonymous commercial de-icer product based on 50% w/w potassium formate.

EXAMPLE 1

Ice Melting Rate at −2° C.

Figure 3:
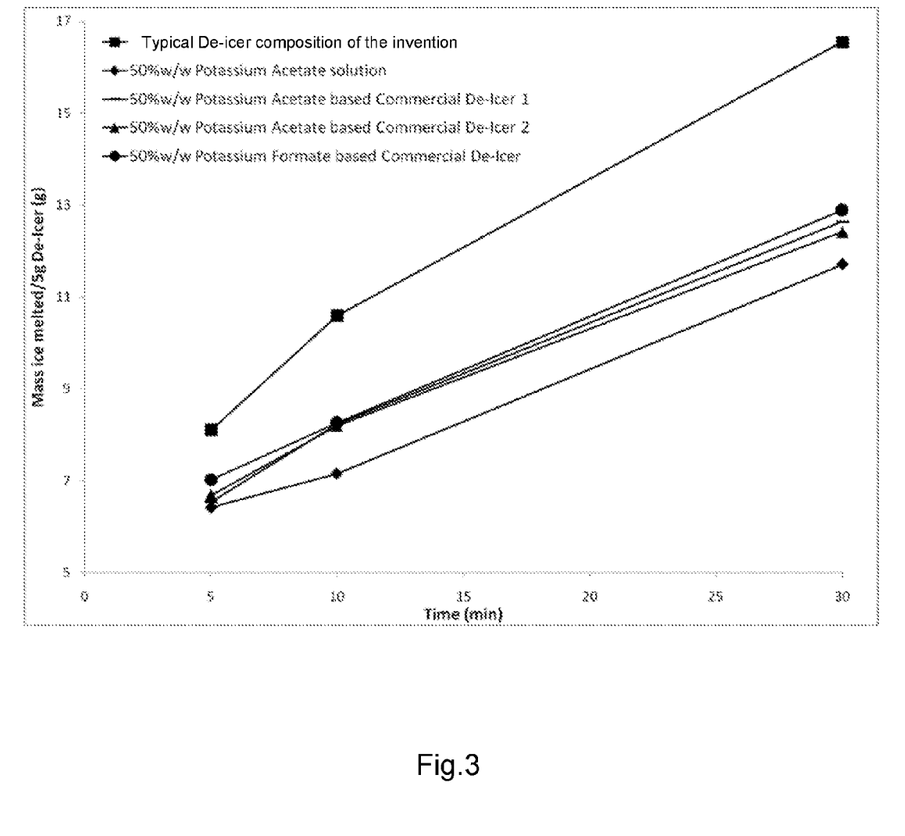
FIG. 3 is a graph showing the mass of ice melted per 5 g for various de-icer compositions at −2° C. plotted against time.

FIG. 3 shows the results of the first test conducted at an ambient temperature of −2° C. (28° F.). On average, the ice melting rate of the de/anti-icer composition of the present disclosure was found to be 30% greater than the other compositions tested at −2° C.

EXAMPLE 2

Ice Melting Rate at −10° C.

Figure 4:
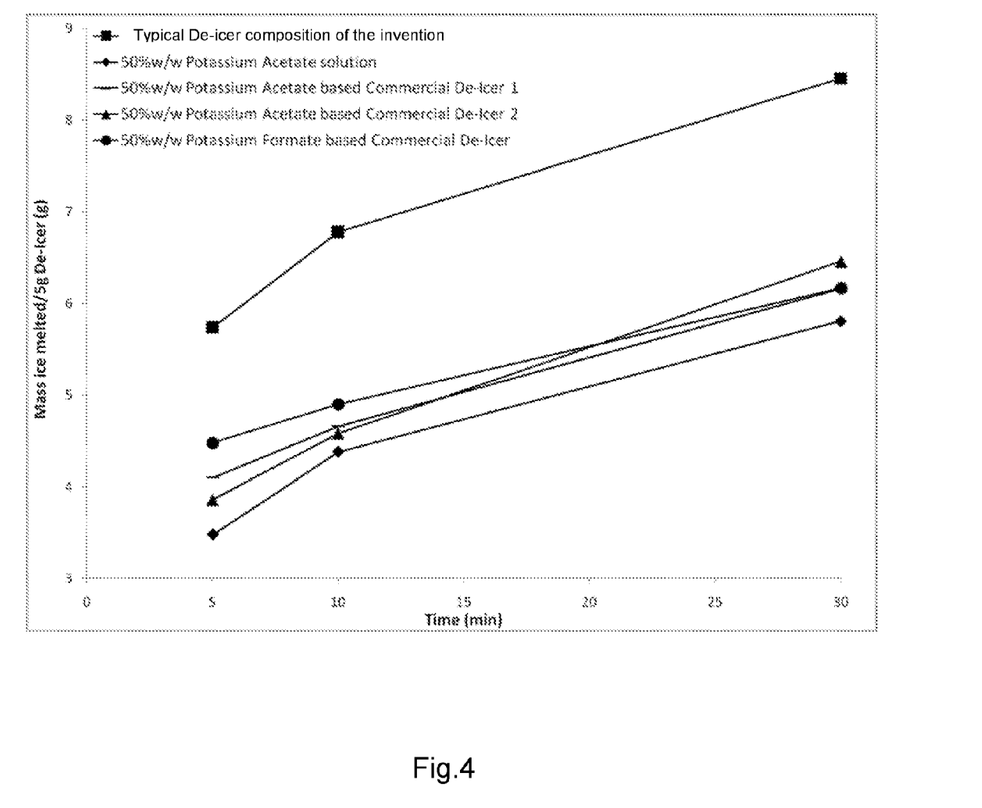
FIG. 4 is a graph showing the mass of ice melted per 5 g for various de-icer compositions at −10° C. plotted against time.

FIG. 4 shows the results of the second test conducted at an ambient temperature of −10° C. (14° F.). On average, the ice melting rate of the de/anti-icer composition of the present disclosure was found to be 43% greater than the other compositions tested at −10° C.

EXAMPLE 3

Heat of Hydration Test Method and Results

In the description and claims of the present application, reference is made to "the heat of hydration test procedure as specified herein". The heat of hydration test procedure thus referred to is as specified in the following three sections HTP1, HTP2 and HTP3.

HTP1
Apparatus and reagents required:—
 clean, dry 250 ml tall-form borosilicate glass beaker;
 clean, dry 150 ml tall-form borosilicate glass beaker;
 clean, dry laboratory stirring thermometer, working range at least 10 to 40° C. (50 to 104° F.), with individual graduations no greater than 1° C. (2° F.), in good working order and reliable state of calibration;
 top-pan laboratory balance of precision ±0.1 g, in good working order and reliable state of calibration;
 expanded polystyrene or mineral-wool type insulation;
 ASTM D1193 type IV water;
 de/anti-icer product sample.

HTP2
Test Procedure
i. The test is performed at an ambient temperature of between 15 to 25° C. (59 to 77° F.). Allow all chemicals and equipment to equilibrate at room temperature before proceeding.
ii. Weigh 100 g±0.1 g of ASTM D1193 type IV water into a clean, dry 150 ml beaker. Measure the temperature of the water using the thermometer. Allow the initial temperature of the water to equilibrate at between 15 to 25° C. (59 to 77° F.) and record this temperature before proceeding.
iii. Weigh 100 g±0.1 g of de/anti-icer product sample into a clean, dry 250 ml beaker.
Thoroughly dry the thermometer and measure the temperature of the de/anti-icer. Allow the initial temperature of the de/anti-icer to equilibrate at between 15 to 25° C. (59 to 77° F.) and record this temperature before proceeding.
iv. Insulate the beaker containing the de/anti-icer with at least 10 mm expanded polystyrene or mineral-wool type insulation covering the entire bottom of the beaker and the sides of the beaker up to at least ⅘ths height.
v. Add all of the water into the beaker containing the de/anti-icer. Mix the de/anti-icer and water together by gentle but fairly rapid stirring with the thermometer. Observe the temperature of the mixture as shown by the thermometer throughout the mixing process. When the temperature stops increasing, the test is complete. Record the maximum temperature reached.

HTP3—Calculation of Heat of Hydration Test Results
The temperature increase obtained is calculated using the formula:

$$\delta T = T_{max} - (T_i^{de\text{-}icer} / T_i^{Water})$$

where: $\delta T$=Temperature increase (° C.);
 $T_{max}$=Maximum temperature observed (° C.);
 $T_i^{de\text{-}icer}$=Initial equilibrated temperature de/anti-icer product sample (° C.);
 $T_i^{Water}$=Initial equilibrated temperature water (° C.).
(Temperature in ° F. values may be substituted for temperature in ° C. values provided that temperature in ° F. is used for all measurements in the test).

The heat of hydration test results for various de/anti-icer compositions are shown in Table 3.

TABLE 3

Heat of hydration test conducted on a 50% w/w potassium acetate solution, two commercial potassium acetate de-icer solutions, a commercial potassium formate de-icer, and the de/anti-icer compositions 1 and 3 as described in Table 1

| | Sample 1 | Sample 2 | Sample 3 | MEAN |
|---|---|---|---|---|
| 50% w/w Potassium Acetate Solution | | | | |
| Start mass de-icer (g) | 50.23 | 49.86 | 50.44 | 50.18 |
| Start temp. de-icer (° C.) | 18 | 17 | 17 | 17.3 |
| Start mass water (g) | 50.11 | 50.39 | 49.88 | 50.13 |
| Start temp. water (° C.) | 17 | 17 | 17 | 17 |
| Max. temp. mixture (° C.) | 17.5 | 17 | 17 | 17 |
| Net system temp. increase (° C.) | 0.0 | 0.0 | 0.0 | 0.0 |
| Commercial 50% w/w Potassium Acetate Solution-based product 1 | | | | |
| Start mass de-icer (g) | 50.36 | 49.97 | 49.76 | 50.03 |
| Start temp. de-icer (° C.) | 19 | 19 | 18 | 18.7 |
| Start mass water (g) | 49.77 | 50.22 | 50.16 | 50.05 |
| Start temp. water (° C.) | 17 | 17 | 17 | 17 |
| Max. temp. mixture (° C.) | 18 | 18 | 17.5 | 18 |
| Net system temp. increase (° C.) | 0.0 | 0.0 | 0.0 | 0.0 |
| Commercial 50% w/w Potassium Acetate Solution-based product 2 | | | | |
| Start mass de-icer (g) | 50.40 | 50.08 | 50.31 | 50.26 |
| Start temp. de-icer (° C.) | 17 | 18 | 19 | 18.0 |
| Start mass water (g) | 49.68 | 50.27 | 50.20 | 50.05 |
| Start temp. water (° C.) | 17 | 17 | 17 | 17 |
| Max. temp. mixture (° C.) | 17 | 17.5 | 18 | 18 |
| Net system temp. increase (° C.) | 0.0 | 0.0 | 0.0 | 0.0 |
| Commercial 50% w/w Potassium Formate Solution-based product | | | | |

TABLE 3-continued

Heat of hydration test conducted on a 50% w/w potassium acetate solution, two commercial potassium acetate de-icer solutions, a commercial potassium formate de-icer, and the de/anti-icer compositions 1 and 3 as described in Table 1

|  | Sample 1 | Sample 2 | Sample 3 | MEAN |
|---|---|---|---|---|
| Start mass de-icer (g) | 49.92 | 50.23 | 50.33 | 50.16 |
| Start temp. de-icer (° C.) | 17 | 17 | 19 | 17.7 |
| Start mass water (g) | 49.77 | 49.87 | 50.14 | 49.93 |
| Start temp. water (° C.) | 17 | 17 | 17 | 17 |
| Max. temp. mixture (° C.) | 17 | 17 | 18 | 17 |
| Net system temp. increase (° C.) | 0.0 | 0.0 | 0.0 | 0.0 |
| Composition 1 of the invention as described in Table 1 | | | | |
| Start mass de-icer (g) | 50.44 | 50.16 | 49.68 | 50.09 |
| Start temp. de-icer (° C.) | 18 | 19 | 20 | 19.0 |
| Start mass water (g) | 50.29 | 50.33 | 50.13 | 50.25 |
| Start temp. water (° C.) | 17 | 17 | 17 | 17 |
| Max. temp. mixture (° C.) | 20 | 21 | 22 | 21 |
| Net system temp. increase (° C.) | 2.5 | 3.0 | 3.5 | 3.0 |
| Composition 3 of the invention as described in Table 1 | | | | |
| Start mass de-icer (g) | 49.90 | 50.12 | 50.32 | 50.11 |
| Start temp. de-icer (° C.) | 18 | 19 | 18 | 18.3 |
| Start mass water (g) | 50.15 | 50.27 | 49.69 | 50.04 |
| Start temp. water (° C.) | 17 | 17 | 17 | 17 |
| Max. temp. mixture (° C.) | 22 | 23 | 22 | 22 |
| Net system temp. increase (° C.) | 4.5 | 5.0 | 4.5 | 4.7 |

With reference to the results in Table 3, the de/anti-icer composition 1 as described in Table 1 exhibits a net system temperature increase of 3.0° C. (6° F.) when mixed on an equal weight basis with water. The de/anti-icer composition 3 as described in Table 1 exhibits a net temperature increase of from 4° C. to 5° C. (7° F. to 9° F.). In comparison, a 50% w/w potassium acetate solution or 50% w/w potassium formate solution exhibits no net system temperature increase.

EXAMPLE 4

Ice Melting Performance Relative to 50% w/w Potassium Acetate

In the description and claims of the present application, reference is made to "the ice melting performance test procedure as specified herein". The ice melting performance test procedure thus referred to is as specified in the following three sections IMP1, IMP2 and IMP3.

IMP1

Apparatus and reagents required:
clean, dry 150 mm diameter petri dishes, one per test;
clean, dry 100 ml squat-form borosilicate glass beakers, one per test;
clean, dry disposable 5 ml plastic syringes, one per test;
clean, dry 100 ml graduated measuring cylinder, capable of accurately measuring 60 ml of liquid;
top-pan laboratory balance of precision ±0.01 g, in good working order and reliable state of calibration;
stop/start digital timer, capable of timing up to 30 minutes in maximum 1 second intervals and in good working order and reliable state of calibration;
compressed air source, free from oil, dirt or any other impurities, at a pressure between 103 KPa and 140 KPa;
freezer or cold chamber capable of maintaining temperatures of −2° C. and −10° C.±1° C. (28° F. and 14° F.±2° F.);
waterproof permanent marker;
ASTM D1193 type IV water;
de/anti-Icer product sample;
control sample—50% w/w potassium acetate aqueous solution (this can be produced from anhydrous potassium acetate powder obtained from the Sigma Aldrich Corporation, St. Louis, Mo., USA, and ASTM D1193 type IV water).

IMP2

Test Procedure

Part 1: Preparing Ice Samples:
i. Store the Petri dishes (one per test, for a minimum of six tests), measuring cylinder and ASTM D1193 type IV water at a temperature of 4° C.±1° C. (39° F.±2° F.) for a minimum of 8 hours before proceeding to step ii.
ii. Use the permanent marker to label each Petri dish to be used with a number for future identification.
iii. Measure out 60 ml of ASTM D1193 type IV water and pour this into a clean, dry Petri dish. Gently and carefully swirl the Petri dish to ensure even coverage of the water over the bottom of the dish.
iv. Within 5 minutes of filling, place the Petri dish on a flat, level surface at a steady temperature of −10° C.±1° C. (14° F.±2° F.). Leave the Petri dish for a minimum of 8 hours until the water is completely frozen.

Part 2: Melting Test:
Perform repeat tests on at least 3 de/anti-Icer product samples and 3 control samples.
i. Allow the freezer/cold chamber to equilibrate at the required test temperature of either −2° C. or −10° C.±1° C. (±2° F.).
ii. For each test to be performed, label a glass beaker with a number corresponding to one of the Petri dishes to be used in the test, so that all of the Petri dishes have a corresponding beaker.
iii. Store the Petri dishes containing test ice sheets, syringes, sample of de/anti-icer product and control sample of 50% w/w potassium acetate aqueous solution at the required test temperature in the freezer/cold chamber for a minimum of 10 hours before proceeding to step iv.
iv. Weigh each Petri dish containing an ice sheet and record the time in the test, weight and number of the Petri dish. As balance equipment is affected by temperature, the balance must be kept, and all weighing performed, outside of the freezer/cold chamber at normal room temperature. The Petri dish must be removed from the freezer/cold chamber immediately prior to weighing, left on the balance for the minimum time required to obtain a steady and reliable reading on the balance, and then returned to the freezer/cold chamber immediately after weighing.
v. Weigh out 5 g±0.01 g samples of de/anti-icer product sample and control sample in clean, dry 5 ml plastic syringes.
vi. For each 5 g sample, apply the sample uniformly over the ice sheet in a Petri dish. This application procedure should take no more than 15 seconds. As soon as the application procedure is complete, start the digital timer. Record the Petri dish number associated with each sample. This step must be performed in the freezer/cold chamber.
vii. After the required time of 5, 10 or 30 minutes, stop the digital timer then immediately pour the entire liquid contents of each Petri dish into the corresponding numbered beaker by raising the Petri dish to an angle of between 80° to 85° from the horizontal. Gently and carefully blow any final liquid residues from the Petri dish into the beaker using compressed air for a maximum of 10 seconds. This step must be performed in the freezer/cold chamber.

viii. Weigh each Petri dish (including all remaining ice in the dish) according to the procedure described in step iv and record the weight and number of the Petri dish.

IMP3

Calculation of Ice Melting Test Results

At each stage, the total ice melted for each sample is calculated using the formula:

$$m_{im} = m_s - m_e$$

Where: $m_{im}$=Mass ice melted (g);
$m_s$=Initial mass of Petri dish and ice sheet (g);
$m_e$=Final mass of Petri dish and remaining ice (g).

The percentage ice melting performance of the de/anti-icer product compared to the control sample is therefore calculated using the formula $$P = (m_{im}^{de\text{-}icer} / m_{im}^{50\% \ KAc}) \times 100$$

where:

P=Ice melting performance of de/anti-icer product compared to control 50% w/w potassium acetate aqueous solution (%);
$m_{im}^{de\text{-}icer}$=Mean $M_{im}$ value for de/anti-icer product sample;
$M_{im}^{50\% \ KAc}$=Mean $M_{im}$ value for control samples.

A given mass of the de/anti-icer in accordance with the present disclosure will, when applied to the surface of a sample of ice of known mass and surface area at −2° C. (28° F.) or −10° C. (14° F.), over a period of 5, 10 or 30 minutes melt a mass of ice at least 25% greater than the same mass of a 50% w/w aqueous solution of potassium acetate applied to a sample of ice with the same mass and surface area for the same time at the same temperature. More specifically, a given mass of the de/anti-icer in accordance with the present disclosure will, when applied to the surface of a sample of ice of known mass and surface area at −2° C. (28° F.) or −10° C. (14° F.), over a period of 5, 10 or 30 minutes melt a mass of more than 40% greater than a 50% w/w aqueous solution of potassium acetate.

In addition to the performance advantages of the de/anti-icer composition of the disclosure, the composition can also provide a reduced environmental impact compared to conventional de-icer products. This is shown in Table 4.

TABLE 4

COD and BOD values for various de/anti-icer compositions

| De-Icer | COD (mg O$_2$/mg) | BOD$_5$ (mg O$_2$/mg) |
|---|---|---|
| Urea Prills | 2.13 | 2.1 |
| MEG/DEG Glycol Mix | 1.36 | 0.56 |
| 50% w/w Potassium Acetate | 0.36 | 0.25 |
| Composition 3 of the invention as described in Table 1 | 0.34 | 0.15 |

As shown the COD of the de/anti-icer composition of the present disclosure is significantly lower than that of monoethylene and diethylene mixed glycol, urea and also lower than potassium acetate solutions. Furthermore, the BOD$_5$, measured as the amount of dissolved oxygen consumed in five days by biological processes breaking down organic matter, is significantly lower for the de/anti-icer composition of the invention in comparison to monoethylene and diethylene mixed glycol, urea and conventional 50% w/w potassium acetate solutions.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A de-icer or anti-icer composition for a travelled surface comprising:
   at least 25% w/w of acetate salt selected from the group consisting of potassium, sodium, lithium, magnesium, calcium, ammonium acetate and mixtures thereof; and
   from 14% to 50% w/w of non-acetate salt comprising one or more cations selected from the group consisting of potassium, sodium, lithium, magnesium, calcium, ammonium or mixtures thereof and one or more anions selected from the group consisting of formate, propionate, butyrate, isobutyrate, oxalate, malonate, succinate, glutarate, adipate, citrate, gluconate, benzoate, carbonate, bicarbonate, fluoride, chloride, bromide and mixtures thereof;
   the balance being solvent and optionally not more than about 5% w/w in total of auxiliary or incidental additives;
   wherein the acetate salt and the non-acetate salt are present in a solution of the composition; and
   wherein the total concentration of acetate salt and non-acetate salt in the de-icer or anti-icer composition is from 57% w/w to 75% w/w,
   wherein the ratio of acetate salt:non-acetate salt is from about 3:1 to about 1:3.

2. The de-icer or anti-icer composition as claimed in claim 1, wherein the composition is a liquid.

3. The de-icer or anti-icer composition as claimed in claim 1, wherein the composition comprises from 25% to 57% w/w of acetate salt.

4. The de-icer or anti-icer composition as claimed in claim 1, wherein the composition comprises between 30% and 35% w/w of acetate salt.

5. The de-icer or anti-icer composition as claimed in claim 1, wherein the composition comprises from about 14% to about 35% w/w of non-acetate salt.

6. The de-icer or anti-icer composition as claimed in claim 1, wherein the total concentration of acetate salt and non-acetate salt in the de-icer or anti-icer composition is from about 61% to about 65% w/w.

7. The de-icer or anti-icer composition as claimed in claim 1, wherein a cation of at least one acetate salt is selected from the group consisting of potassium, sodium, lithium and mixtures thereof.

8. The de-icer or anti-icer composition as claimed in claim 7, wherein said cation is potassium.

9. The de-icer or anti-icer composition as claimed in claim 1, wherein a cation of at least one non-acetate salt is selected from the group consisting of potassium, sodium, lithium and mixtures thereof.

10. The de-icer or anti-icer composition as claimed in claim 9, wherein said cation is potassium.

11. The de-icer or anti-icer composition as claimed in claim 1, wherein at least one non-acetate salt comprises one or more anions selected from the group consisting of formate, propionate, succinate and mixtures thereof.

12. The de-icer or anti-icer composition as claimed in claim 1, wherein at least one non-acetate salt comprises one or more anions selected from the group consisting of formate, propionate, and mixtures thereof.

13. The de-icer or anti-icer composition as claimed in claim 11, wherein said anion is formate.

14. The de-icer or anti-icer composition as claimed in claim 1, wherein said acetate salt is potassium acetate and said non-acetate salt is potassium formate.

15. The de-icer or anti-icer composition as claimed in claim 1, wherein the composition comprises auxiliary or incidental additives selected from the group consisting of one or more of corrosion inhibitors, stabilisers, viscosity modifiers, surfactants, pH buffers, anti-foaming agents and dyes.

16. The de-icer or anti-icer composition as claimed in claim 1, wherein the composition comprises a corrosion inhibitor having a total concentration of not more than about 1% by weight of the composition.

17. The de-icer or anti-icer composition as claimed in claim 1, wherein the pH of the composition is from 7 to 11.5.

18. The de-icer or anti-icer composition as claimed in claim 1, wherein said composition exhibits a net system temperature increase of at least 1.0° C. (2° F.) when mixed on an equal weight basis with water when following a heat of hydration test.

19. The de-icer or anti-icer composition as claimed in claim 1, wherein a given mass of said composition, when applied to a surface of a sample of ice of known mass and surface area at from −2° C. (28° F.) to −10° C. (14° F.), over a period of from 5 to 30 minutes, melts a mass of ice at least 25% greater than the same mass of a 50% w/w aqueous solution of potassium acetate applied to a sample of ice with the same mass and surface area for the same time at the same temperature.

20. The de-icer or anti-icer composition as claimed in claim 1, wherein said solvent is an aqueous solvent.

21. The de-icer or anti-icer composition as claimed in claim 1, wherein the total concentration of acetate salt and non-acetate salt in the de-icer or anti-icer composition is from about 62.25% to about 62.75%.

22. The de-icer or anti-icer composition as claimed in claim 1, wherein the composition comprises from 21% to 50% w/w of non-acetate salt.

23. A method of treating a travelled surface comprising applying to the surface a de-icing or anti-icing composition of claim 1.

24. The method as claimed in claim 23, wherein the method of treating comprises a de-icing treatment.

25. The method as claimed in claim 23, wherein the method of treating comprises a method of preventing or deterring ice formation and/or snow build up on the travelled surface.

26. A de-icer or anti-icer composition for a travelled surface comprising:
at least 25% w/w of acetate salt selected from the group consisting of potassium, sodium, lithium, magnesium, calcium, ammonium acetate and mixtures thereof;
from 14% to 50% w/w of non-acetate salt comprising one or more cations selected from the group consisting of potassium, sodium, lithium, magnesium, calcium, ammonium or mixtures thereof and one or more anions selected from the group consisting of formate, propionate, butyrate, isobutyrate, oxalate, malonate, succinate, glutarate, adipate, citrate, benzoate, carbonate, bicarbonate, fluoride, chloride, bromide and mixtures thereof; and
the balance being solvent and optionally not more than about 5% w/w in total of auxiliary or incidental additives;
wherein the acetate salt and the non-acetate salt are present in a solution of the composition; and
wherein the ratio of acetate salt:non-acetate salt is from about 3:1 to about 1:3 and the total concentration of acetate salt and non-acetate salt in the de-icer or anti-icer composition is at least about 57% w/w.

27. A de-icer or anti-icer composition for a travelled surface comprising:
at least 25% w/w of acetate salt selected from the group consisting of potassium, sodium, lithium, magnesium, calcium, ammonium acetate and mixtures thereof;
from 16% to 50% w/w of non-acetate salt comprising one or more cations selected from the group consisting of potassium, sodium, lithium, magnesium, calcium, ammonium or mixtures thereof and one or more anions selected from the group consisting of formate, propionate, butyrate, isobutyrate, oxalate, malonate, succinate, glutarate, adipate, citrate, gluconate, benzoate, carbonate, bicarbonate, fluoride, chloride, bromide and mixtures thereof; and
the balance being solvent and optionally not more than about 5% w/w in total of auxiliary or incidental additives;
wherein the acetate salt and the non-acetate salt are present in a solution of the composition, and the total concentration of acetate salt and non-acetate salt in the de-icer or anti-icer composition is at least about 57% w/w; and
wherein said composition exhibits a net system temperature increase of at least 1.0° C. (2° F.) when mixed on an equal weight basis with water when following a heat of hydration test.

* * * * *